(12) United States Patent
Doddridge

(10) Patent No.: US 12,587,275 B2
(45) Date of Patent: Mar. 24, 2026

(54) METHODS AND APPARATUS FOR IMPLEMENTING A FIBER OPTIC REFLECTANCE STANDARD

(71) Applicant: The United States of America, as represented by the Secretary of the Navy, Crane, IN (US)

(72) Inventor: Lance S Doddridge, Ontario, CA (US)

( * ) Notice: Subject to any disclaimer, the term of this patent is extended or adjusted under 35 U.S.C. 154(b) by 210 days.

(21) Appl. No.: 18/236,223

(22) Filed: Aug. 21, 2023

(65) Prior Publication Data

US 2024/0072889 A1 Feb. 29, 2024

Related U.S. Application Data

(60) Provisional application No. 63/399,307, filed on Aug. 19, 2022.

(51) Int. Cl.
| | |
|---|---|
| *H04B 10/00* | (2013.01) |
| *H04B 10/071* | (2013.01) |
| *H04B 10/2537* | (2013.01) |
| *H04J 14/00* | (2006.01) |

(52) U.S. Cl.
CPC ....... *H04B 10/071* (2013.01); *H04B 10/2537* (2013.01)

(58) Field of Classification Search
CPC .................................................... H04B 10/071
See application file for complete search history.

(56) References Cited

U.S. PATENT DOCUMENTS

2023/0280153 A1* 9/2023 Stromski ............ G01B 9/02055
356/450

* cited by examiner

*Primary Examiner* — Daniel G Dobson
(74) *Attorney, Agent, or Firm* — Naval Surface Warfare Center, Crane Division; Patrick B. Law

(57) ABSTRACT

Methods, apparatus, and systems are disclosed for implementing a fiber optic reflectance standard (FORS) for testing and/or calibration of a test instrument (TI), which provides a traceable means to calibrate the making optical return loss measurements (ORLM). The apparatus for implementing the FORS may include an optical splitter, first and second optical inputs coupled to the optical splitter, and an optical fiber having first and second ends, and coupled to the optical splitter at the first end of the optical fiber. Furthermore, the apparatus includes an attenuator (e.g., a mechanical attenuator) configured to contain a portion of the optical fiber between the first and second ends and selectively attenuate optical signal gain of the optical fiber. The testing and/or calibration results in an uncertainty that is at least four times better than a typical test instrument.

15 Claims, 12 Drawing Sheets

1000

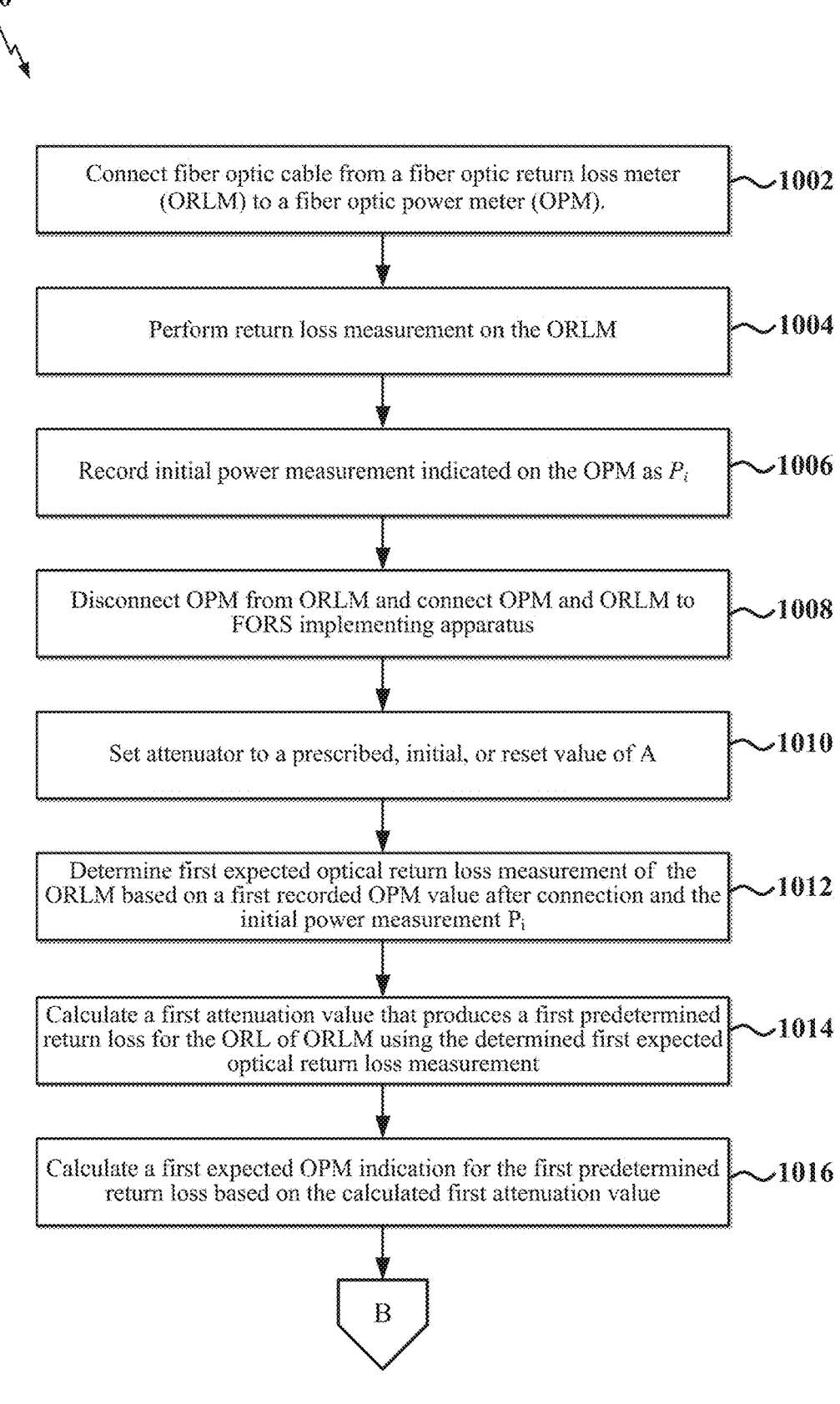

Connect fiber optic cable from a fiber optic return loss meter (ORLM) to a fiber optic power meter (OPM). — 1002

Perform return loss measurement on the ORLM — 1004

Record initial power measurement indicated on the OPM as $P_i$ — 1006

Disconnect OPM from ORLM and connect OPM and ORLM to FORS implementing apparatus — 1008

Set attenuator to a prescribed, initial, or reset value of A — 1010

Determine first expected optical return loss measurement of the ORLM based on a first recorded OPM value after connection and the initial power measurement $P_i$ — 1012

Calculate a first attenuation value that produces a first predetermined return loss for the ORL of ORLM using the determined first expected optical return loss measurement — 1014

Calculate a first expected OPM indication for the first predetermined return loss based on the calculated first attenuation value — 1016

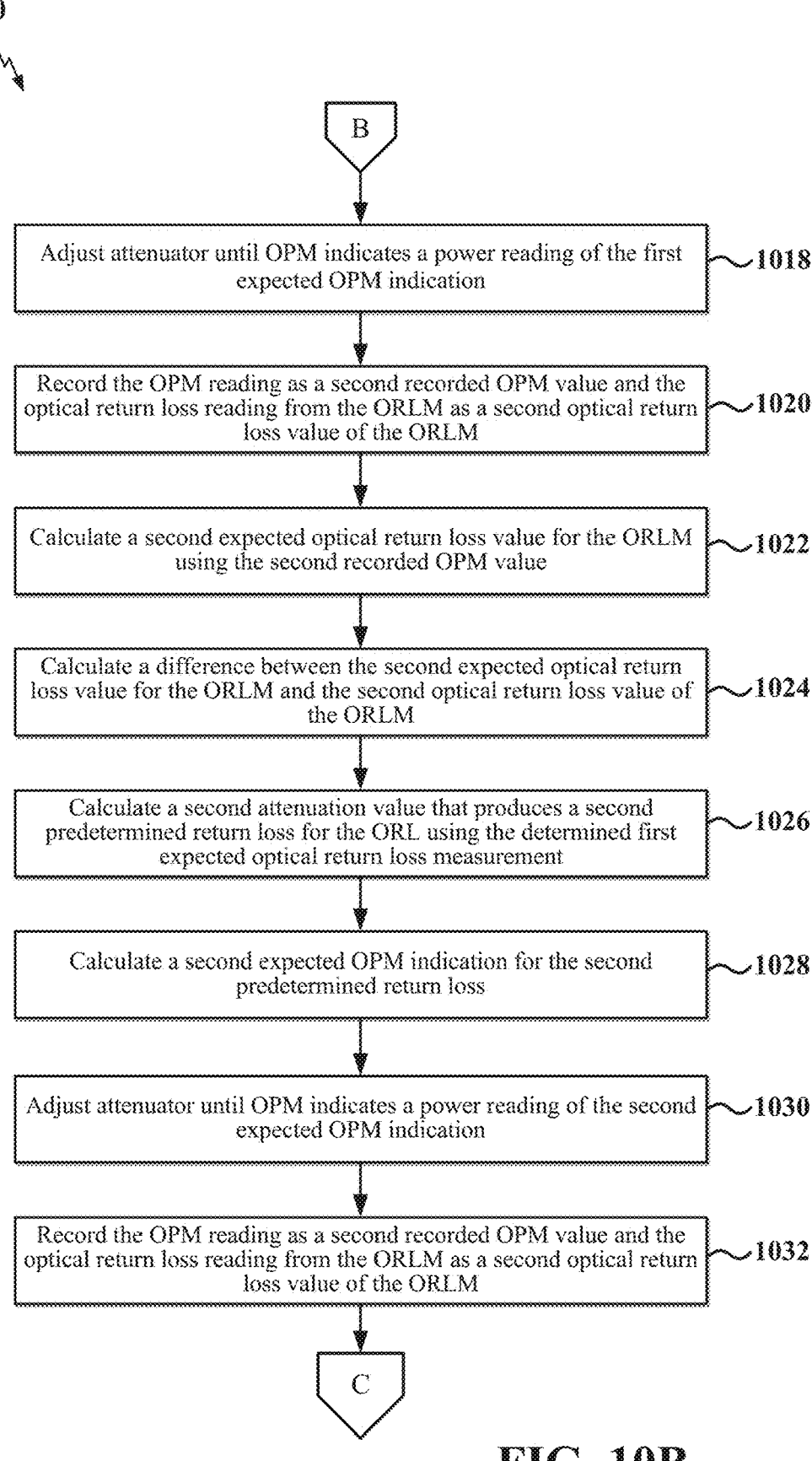

B

Adjust attenuator until OPM indicates a power reading of the first expected OPM indication —1018

Record the OPM reading as a second recorded OPM value and the optical return loss reading from the ORLM as a second optical return loss value of the ORLM —1020

Calculate a second expected optical return loss value for the ORLM using the second recorded OPM value —1022

Calculate a difference between the second expected optical return loss value for the ORLM and the second optical return loss value of the ORLM —1024

Calculate a second attenuation value that produces a second predetermined return loss for the ORL using the determined first expected optical return loss measurement —1026

Calculate a second expected OPM indication for the second predetermined return loss —1028

Adjust attenuator until OPM indicates a power reading of the second expected OPM indication —1030

Record the OPM reading as a second recorded OPM value and the optical return loss reading from the ORLM as a second optical return loss value of the ORLM —1032

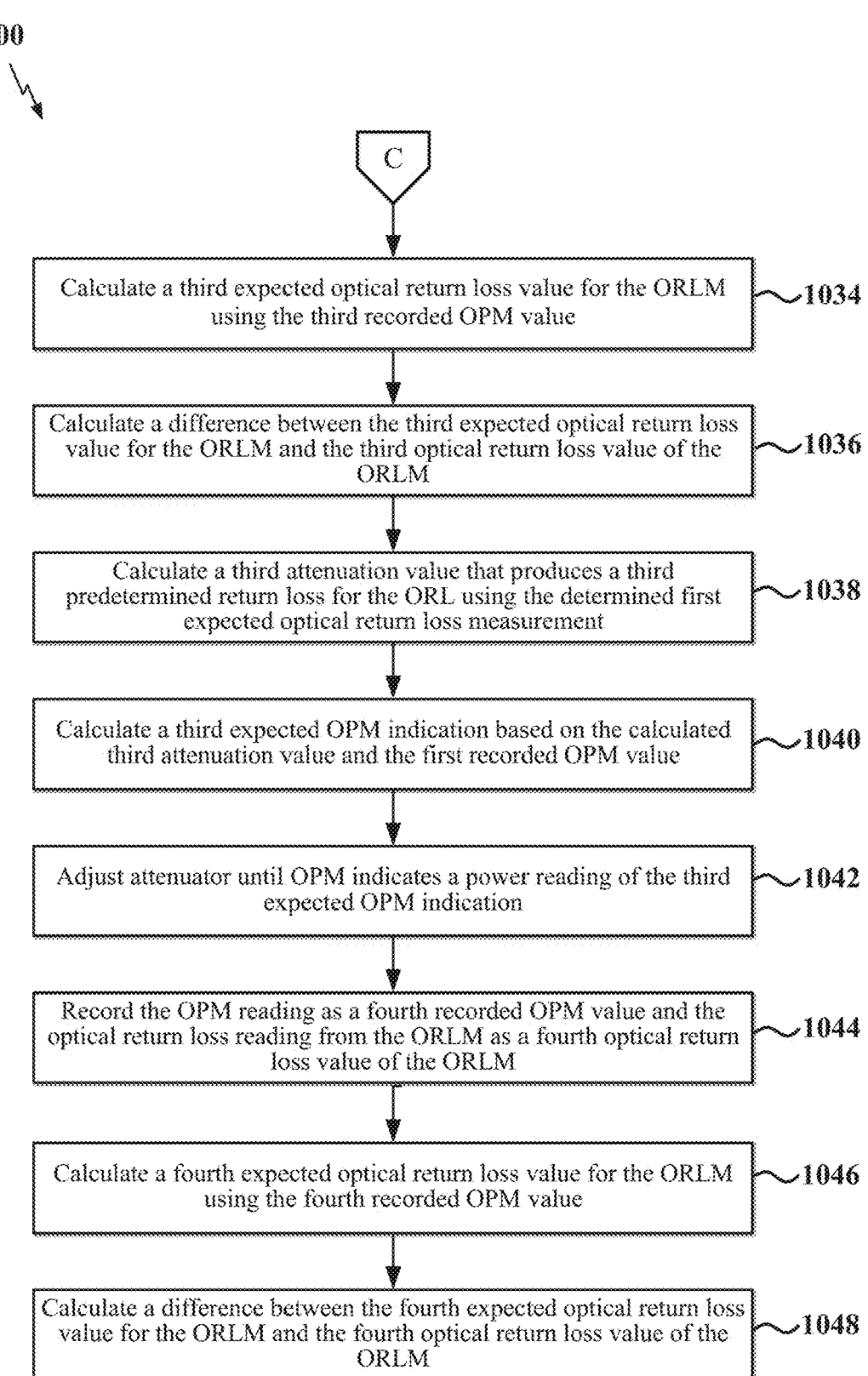

C

Calculate a third expected optical return loss value for the ORLM using the third recorded OPM value ~1034

Calculate a difference between the third expected optical return loss value for the ORLM and the third optical return loss value of the ORLM ~1036

Calculate a third attenuation value that produces a third predetermined return loss for the ORL using the determined first expected optical return loss measurement ~1038

Calculate a third expected OPM indication based on the calculated third attenuation value and the first recorded OPM value ~1040

Adjust attenuator until OPM indicates a power reading of the third expected OPM indication ~1042

Record the OPM reading as a fourth recorded OPM value and the optical return loss reading from the ORLM as a fourth optical return loss value of the ORLM ~1044

Calculate a fourth expected optical return loss value for the ORLM using the fourth recorded OPM value ~1046

Calculate a difference between the fourth expected optical return loss value for the ORLM and the fourth optical return loss value of the ORLM ~1048

FIG. 10C

METHODS AND APPARATUS FOR IMPLEMENTING A FIBER OPTIC REFLECTANCE STANDARD

CROSS REFERENCE TO RELATED APPLICATIONS

The present application claims the benefit of and priority to U.S. Provisional Application Ser. No. 63/399,307 filed on Aug. 19, 2022, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 210919US02) is assigned to the United States Government and is available for licensing for commercial purposes. Licensing and technical inquiries may be directed to the Technology Transfer Office, Naval Surface Warfare Center Corona, email: CRNA_CTO@navy.mil.

FIELD

The present invention relates to apparatus and methods for implementing a fiber optic reflectance standard (FORS), and more particularly to methods, apparatus and systems to implement the FORS for calibration of instruments that perform optical return loss (ORL) measurements for fiber optic communication systems.

BACKGROUND

In fiber optic communications systems, modulated pulses of laser or LED light are transmitted into a fiber optic cable. The pulses of laser/LED power may traverse many interconnected sections of fiber optic cabling before they reach their destination sensor, which demodulates the information contained in the modulated pulses. In an ideal situation, all of the optical power transmitted in the pulses would reach the destination sensor without losing any signal integrity. In real world applications, however, the optical pulses reach the sensor after experiencing attenuation, dispersion, and other losses of signal integrity and power.

In fiber optic communications systems, one cause of loss of signal integrity is reflections of optical power that occur at connection points where two cables are mated. Much smaller amounts of optical power are also reflected throughout the length of any fiber optic cable due to a phenomenon called back-scatter. Both types of reflections cause optical power to return along the fiber cable to the transmitting source. When this reflected optical power reaches the transmitting laser, it can cause spectral and power instability in the laser, leading to further degradation of the transmitted signal, and even possibly cause damage to the laser itself. This degradation can have dramatic effects in high-speed fiber optic communications systems. The ratio of the amount of light that is transmitted through the fiber optic network and the amount reflected back to the transmitting laser is called the optical return loss (ORL). Optical return loss is closely analogous to a voltage standing wave ratio (VSWR) occurring in high-frequency electrical communications systems.

For military applications, the measurement of optical return loss is mandated by a number of maintenance procedures in the Department of Defense, including MIL-STD-2042 (Sections 6K1 and 6L1). This standard requires testing of ORL to verify that it is not less than the minimum acceptable return loss of 30 dB for flat-polished connectors, and 40 dB for dome-polished connectors. Verifying these minimum acceptable amounts helps to ensure reliable system operation for fiber optic communication systems.

For verification, there are different test instruments that may be used to measure ORL, such as optical continuous wave reflectance (OCWR) meters, optical time domain reflectometers (OTDR), and optical return loss meters (ORLM), of which the ORLM provides the easiest method of measurement. For more reliable measurements, the accuracy required of the test instrument has been specified as ±0.50 dB by the in-service engineering agent (ISEA) over fiber optic systems in the Naval Sea Systems Command (NAVSEA), as set forth in sub-category (SCAT) 4952/4954 documentation. The specification of this accuracy actually means that an actual value of optical return loss of 29.5 dB may be accepted for flat-polished connectors because the ORLM measured the optical return loss as 30.0 dB, which is within its acceptable tolerance. Similarly, a domed-enhanced polished connector with an actual optical return loss of 39.5 dB may be accepted because the ORLM has measured it as 40.0 dB. A well-calibrated instrument is essential in order to prevent even lower optical return loss values from being accepted by an instrument whose accuracy is not within the ±0.50 dB range.

Because of the importance of making correct measurements that are accurate and consistent, standards organizations have developed measurement practices and methods. The predominant standards organization in North America for fiber optic measurement standards is the Telecommunications Industry Association (TIA), composed of representatives from most of the major manufacturers of fiber optic devices and instruments, as well as participants from academic institutions and government agencies, including the Department of Defense and the National Institute of Standards and Technology (NIST). Concerning ORL measurements, the TIA decided that a round-robin evaluation should be conducted to determine the state-of-the-art in ORL measurements. The round-robin was concluded in 2007 and the data was then analyzed and presented to the TIA in 2008. The results showed that there were relatively large measurement discrepancies between the different participants. For example, single mode tests showed an agreement of roughly ±5 dB on certain artifacts in the 30 dB and 40 dB range, not including some outliers. Multimode tests showed such a large discrepancy that the data was unusable. Surprisingly, each of the participants used their own test instruments, which were calibrated with NIST-traceable standards. However, NIST does not maintain any optical return loss standard, so the traceability of the instruments was established through other measurement paths, which was likely the reason behind the large discrepancies. Since NIST does not maintain an optical return loss standard, the TIA working group was not able to establish the actual value for the artifacts tested.

As a result of these findings, an optical return loss measurement with an accuracy of ±0.50 dB cannot be established by traceable means to a national standard. The optical return loss of an artifact has an actual value that should be able to be measured, regardless of the instrument or participant, as long as best practices for the measurements are followed. Since then, several companies have established their own means for measuring optical return loss, and some of these methods have been presented to the TIA for adoption. One such method has also been drafted into the MIL-STD-2042, "FIBER OPTIC CABLE TOPOLOGY INSTALLATION STANDARD METHODS FOR NAVAL SHIPS". These methods, however, have only enabled optical return loss methods to be made with consistent measurement results. Without proper traceability to a national standard for return loss, however, it is not possible to determine the accuracy of the measurements, however consistent they may be.

A small number of standard methods and artifacts have been developed by industry in order to provide a traceable calibration for optical return loss meters. One artifact proposed makes use of a 1×2 fiber optic splitter. Here, an ORLM under test is connected to one of the two independent inputs. The ORLM transmits power into the splitter, which is then reflected from a connector on the end of the common input. The connector on the common input produces a reflection of approximately 4% or 14 dB. Once this baseline measurement has been made, a 20 dB loss inducing fiber is spliced into the return path of the splitter. This allows the ORLM to be tested at a lower level of reflectance; i.e., at approximately 54 dB (due to the 20 dB loss being traversed twice by the return path). The drawbacks of this approach begin with the uncertainty in the baseline measurement of the 14 dB return loss. This value is extremely difficult to measure accurately, and typically has an uncertainty of 0.50 dB or more. In addition, fusion splicing typically produces another ±0.05 dB to ±0.10 dB of uncertainty. The uncertainty of this method can be expected to have an uncertainty greater than the maximum allowed or required uncertainty of the ORLM under test. Because a calibration artifact must have an uncertainty of 0.12 dB or less to calibrate an ORLM with an accuracy of +0.50 dB, this method does not provide an acceptable approach to ORLM calibration.

SUMMARY

According to an illustrative example of the present disclosure, methods, apparatus, and systems are disclosed for implementing a fiber optic reflectance standard (FORS), which provides a traceable means to calibrate a test instrument (TI) making optical return loss (ORL) measurements (e.g., an ORLM) and results in an uncertainty that is at least four times better than a typical test instrument.

In aspects, the present disclosure provides an apparatus for fiber optic instrument testing and calibration that implements a fiber optic reflectance standard (FORS) testing procedure. The apparatus includes an optical splitter, first and second optical inputs coupled to the optical splitter, and an optical fiber having first and second ends, and coupled to the optical splitter at the first end of the optical fiber. Furthermore, the apparatus includes an attenuator (e.g., a mechanical attenuator) configured to contain a portion of the optical fiber between the first and second ends and selectively attenuate optical signal gain of the optical fiber. Further, the apparatus includes an optical reflector coupled to the second end of the optical fiber to reflect back all optical signals through the optical fiber and attenuator back to the splitter.

In other aspects, the present disclosure provides a method for calibrating or testing an optical instrument such as an optical return loss meter (ORLM). The method includes recording an initial return loss measurement on the fiber optic instrument and recording an initial power measurement $P_i$ with an optical power meter (OPM), optically coupling the fiber optic instrument and OPM to a fiber optic reflectance standard (FORS) implementing apparatus configured with an attenuator for selective adjustment of an attenuation of the FORS implementing apparatus and an optical splitter, determining at least a first expected optical return loss measurement of the fiber optic instrument based on the initial power measurement, a first reading of the OPM after optical coupling of the fiber optic instrument and OPM, and splitter characterization data of the optical splitter, calculating a first attenuation value that produces a first predetermined return loss for optical return loss of the fiber optic instrument using the at least a first expected optical return loss measurement, calculating at least a first expected OPM value for the first predetermined return loss based on the calculated first attenuation value, adjusting the attenuation of the FORS implementing apparatus with the attenuator until the OPM reads a power reading equal to the first expected OPM value, recoding a current OPM reading as at least a second recoded OPM value and an optical return loss reading from the fiber optic instrument as a second optical return loss value of the fiber optic instrument, determining at least a second expected optical return loss measurement of the fiber optic instrument based on the initial power measurement, at least a current second reading of the OPM, and the splitter characterization data of the optical splitter, calculating at least a second attenuation value that produces at least a second predetermined return loss for optical return loss of the fiber optic instrument using the at least a second expected optical return loss measurement, calculating at least a second expected OPM for the second predetermined return loss based on the calculated at least a second attenuation value, adjusting the attenuation of the FORS implementing apparatus with the attenuator until the OPM reads a power reading equal to the at least a second expected OPM, and calculating a difference between the at least a second expected optical return loss for the fiber optic instrument and at least a second optical return loss value for the fiber optic instrument.

Additional features and advantages of the present disclosure will become apparent to those skilled in the art upon consideration of the following detailed description of the illustrative embodiment including exemplifying a best mode of carrying out the invention as presently perceived.

BRIEF DESCRIPTION OF THE DRAWINGS

The detailed description of the drawings particularly refers to the accompanying figures in which:

FIGS. 10A, 10B, and 10C illustrate a flow diagram of a method for carrying out the testing using the disclosed FORS implementing apparatus according to some aspects of the present disclosure.

DETAILED DESCRIPTION

The examples of the presently disclosed invention described herein are not intended to be exhaustive or to limit the invention to precise forms disclosed. Rather, the examples selected for description have been chosen to enable one skilled in the art to practice the invention.

The present disclosure provides methods and apparatus for implementing a fiber optic reflectance standard (FORS), which provides a traceable means to calibrate a test instrument (TI) making optical return loss (ORL) measurements and results in an uncertainty value that is at least four times better than a typical test instrument. When a TI is connected to an apparatus implementing the presently disclosed FORS calibration, a known reflectance is provided to the TI, which can be used to compare with the value of the ORL or reflectance that the TI measures. The reflectance provided by a FORS compliant calibration system is known with very low uncertainty. Additionally, the reflectance is adjustable and can be used to calibrate the TI at several reflectance levels. The reflectance values are monitored with a highly linear optical detector, which is calibrated with traceability to national standards. Whereas typical ORL meters provide measurements with +0.50 dB accuracy, the presently disclosed methods and apparatus implementing the disclosed FORS provide a known return loss with an uncertainty on the order of 0.12 dB or better and a test uncertainty ratio of 4:1 or better.

In further aspects, the presently disclosed methods and apparatus effectuate a calibration standard for calibrating optical return loss meters with an uncertainty of 0.12 dB or less, thus providing the needed accuracy for calibrating an ORLM with an accuracy of 0.50 dB. The disclosed FORS provides a method for varying the reflectance in order to calibrate the ORLM at several different return loss levels, while still maintaining the required uncertainty.

Figure 1:
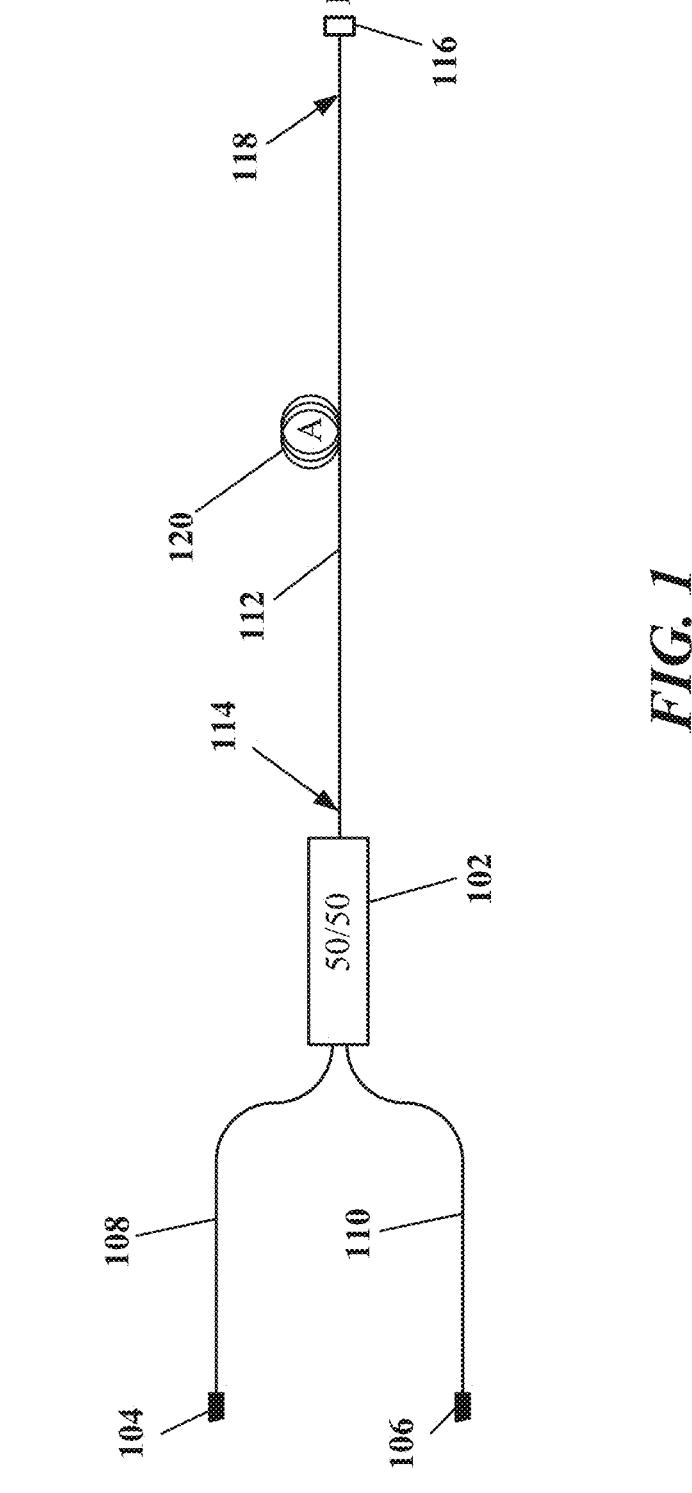
FIG. 1 shows an exemplary apparatus or system that may be utilized for implementing the disclosed fiber optic reflectance standard (FORS) according to aspects of the present disclosure.

Turning to FIG. 1, this figure illustrates an exemplary apparatus or system 100 that may be utilized for implementing the disclosed FORS. In some aspects, the system 100 may be configured as a 1×2 fiber optic splitter constructed with specific non-standard (customized) elements, but this is merely one example and the inventive concepts are not limited to only such constructions. As illustrated, the system 100 includes a fiber optic splitter/coupler 102 that is coupled to an output port 104 and an input port 106 via fiber optic cables (or legs) 108 and 110, respectively. The fiber optic splitter/coupler 102 may be configured as 50:50 ratio (or 50/50) fused biconical taper (FBT) or a planar lightwave circuit (PLC) splitter, and may be polarization maintaining (PM) is some implementations, but is not limited to such and could be non-PM in other implementations. Insertion losses from each leg 108 and 110 into a common fiber 112 coupled at a proximate end 114 of the common fiber 112 to splitter/combiner 102 must be carefully and accurately determined with an uncertainty on the order of 0.05 to 0.10 dB. The system 100 also includes a reflector 116 coupled to a distal end 118 of the common fiber 112. The reflector 116 constitutes a termination of the common fiber 112 and is configured with 100% reflectivity.

In further aspects, it is noted that, in one example, the input port 106 and the output port 104 may be implemented using an angled connector with a nominal return loss greater than 55 dB. In further examples, the input port 106 may be coupled to an optical return loss meter (ORLM) during a calibration process and the output port 104 coupled to a standard optical power meter (OPM) during the calibration process (specifically during calibration of the ORLM), which will be discussed later.

System 100 further includes an attenuator 120 in-line on the common fiber 112, where the attenuator is configured with an attenuation factor or loss "A." In aspects, the common fiber 112 ideally should have an attenuating device in-line that produces absolutely no back reflections (i.e., optical return loss) and no insertion loss when set to zero. The range of attenuation also should be greater than 35 dB. An attenuator with such specifications, however, is not commercially available. Accordingly, the present disclosure includes a further attenuator design for element 120 that was developed to implement the present system and will be discussed later in connection with FIG. 7.

It is noted that the calibration of an ORLM using the presently disclosed apparatus and methods may employ ancillary, commercially available equipment, such as an optical power meter (OPM) with a linearity on the order of 0.02 dB and single mode patch cables with angled polished connectors that yield greater than 55 dB of return loss, as merely examples. Accordingly, before an ORLM is connected to the FORS implementing system (e.g., 100) for calibration, an output power measurement is made by connecting an ORLM directly to an OPM. An example of such a setup is shown at 200 in FIG. 2.

Figure 2:
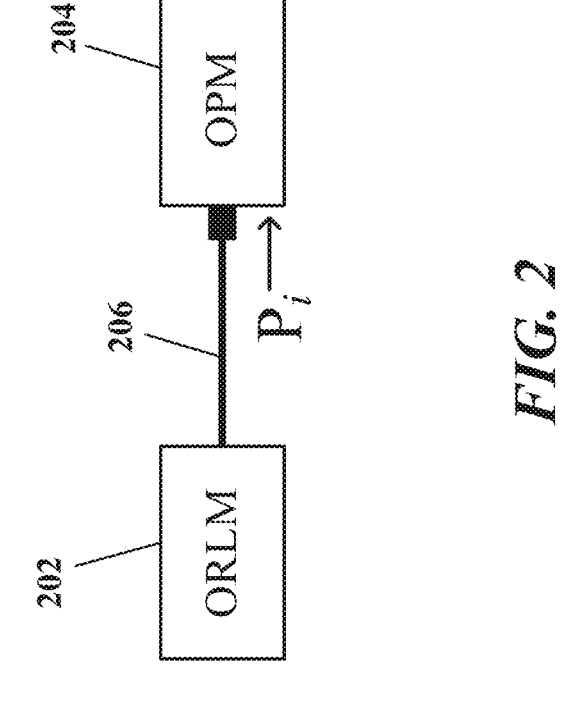
FIG. 2 illustrates an exemplary setup for output power measurement by connecting an ORLM directly to an OPM according to some aspects of the present disclosure.

As illustrated in FIG. 2, the setup 200 includes an ORLM 202, an OPM 204, and a single mode patch cable 206. In this setup, the ORLM return loss measurement function is turned on, and the OPM measures the output power delivered during the ORLM optical return loss measurement process. The output power measured is referred to as $P_i$. This measured output power $P_i$ is then utilized during calibration procedures as will be discussed in more detail below.

Figure 3:
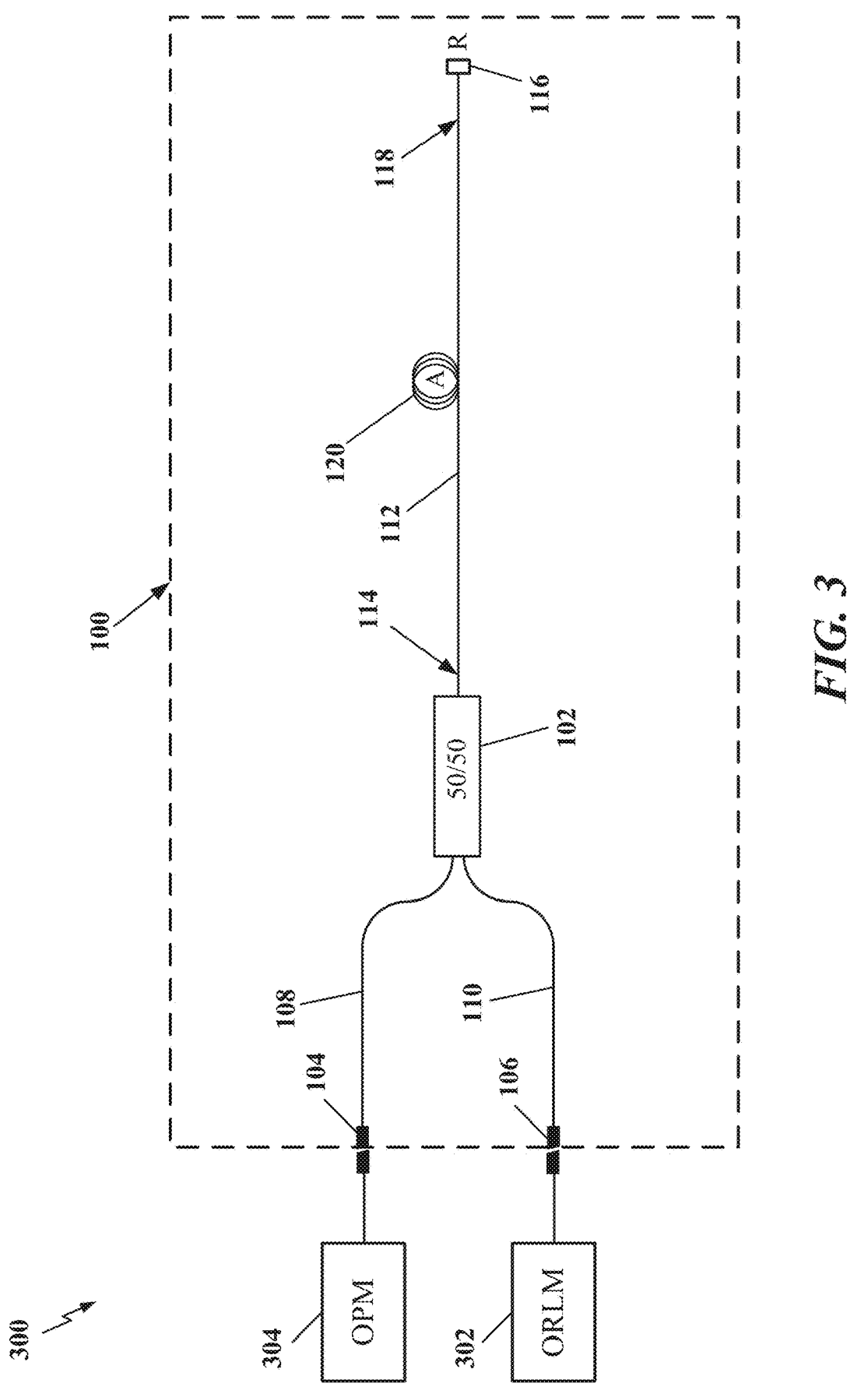
FIG. 3 illustrates an example system setup where an ORLM and OPM are coupled to the system of FIG. 1 according to aspects of the present disclosure.

FIG. 3 illustrates an example setup 300 wherein an ORLM 302 and OPM 304 are coupled to the system 100 described in FIG. 1. As shown, an ORLM 302 is coupled to the input port 106 of the system 100. In some examples, this coupling may be accomplished using a single mode patch cable, but is not limited to such. Further, an OPM 304 is coupled to the output port 104 of system 100, which may be using a single mode patch cable, but not limited to such.

Figure 4:
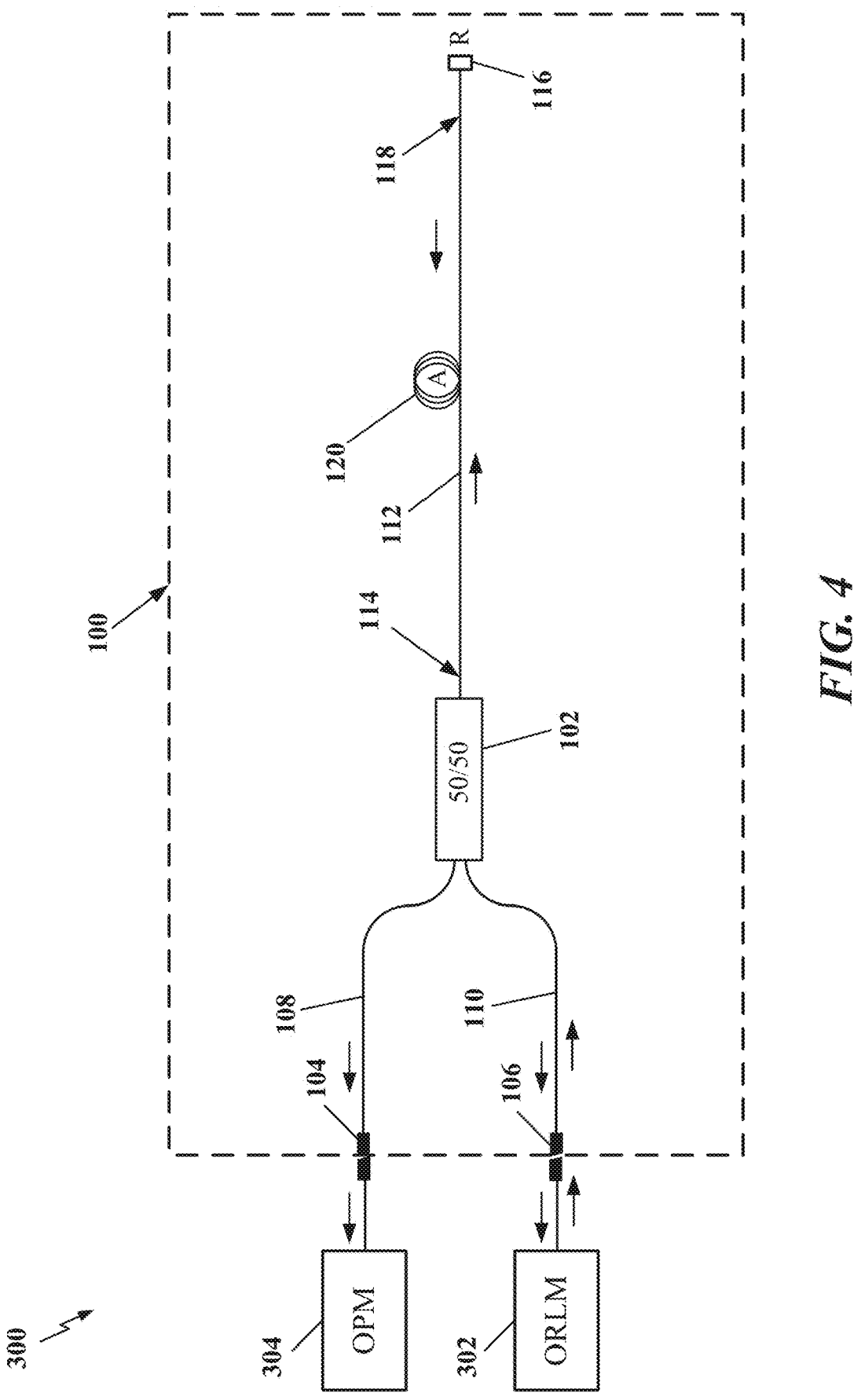
FIG. 4 illustrates the directions of optical power travel for the system setup of FIG. 3 according to aspects of the present disclosure.

FIG. 4 illustrates the directions of optical power travel for the system setup 300 of FIG. 3. With the ORLM 302 and OPM 304 connected, FIG. 4, in particular, shows the direction of optical power when the ORLM 302 is energized for an optical return loss measurement (i.e., for calibration of ORLM 302 showing directions of travel of optical power through the FORS system 100). As may be seen in FIG. 4, optical power flows from the ORLM 302 through input port 106 to splitter 102 and, in turn, over cable 112 through attenuator 120 to reflector 116. The reflected optical power then travels back through attenuator 120 and cable 112 to the splitter 102. The power is then split between legs 108 and 110, with some of the power flowing back to ORLM 302 and some of the power to OPM 304 through output port 104.

Figure 5:
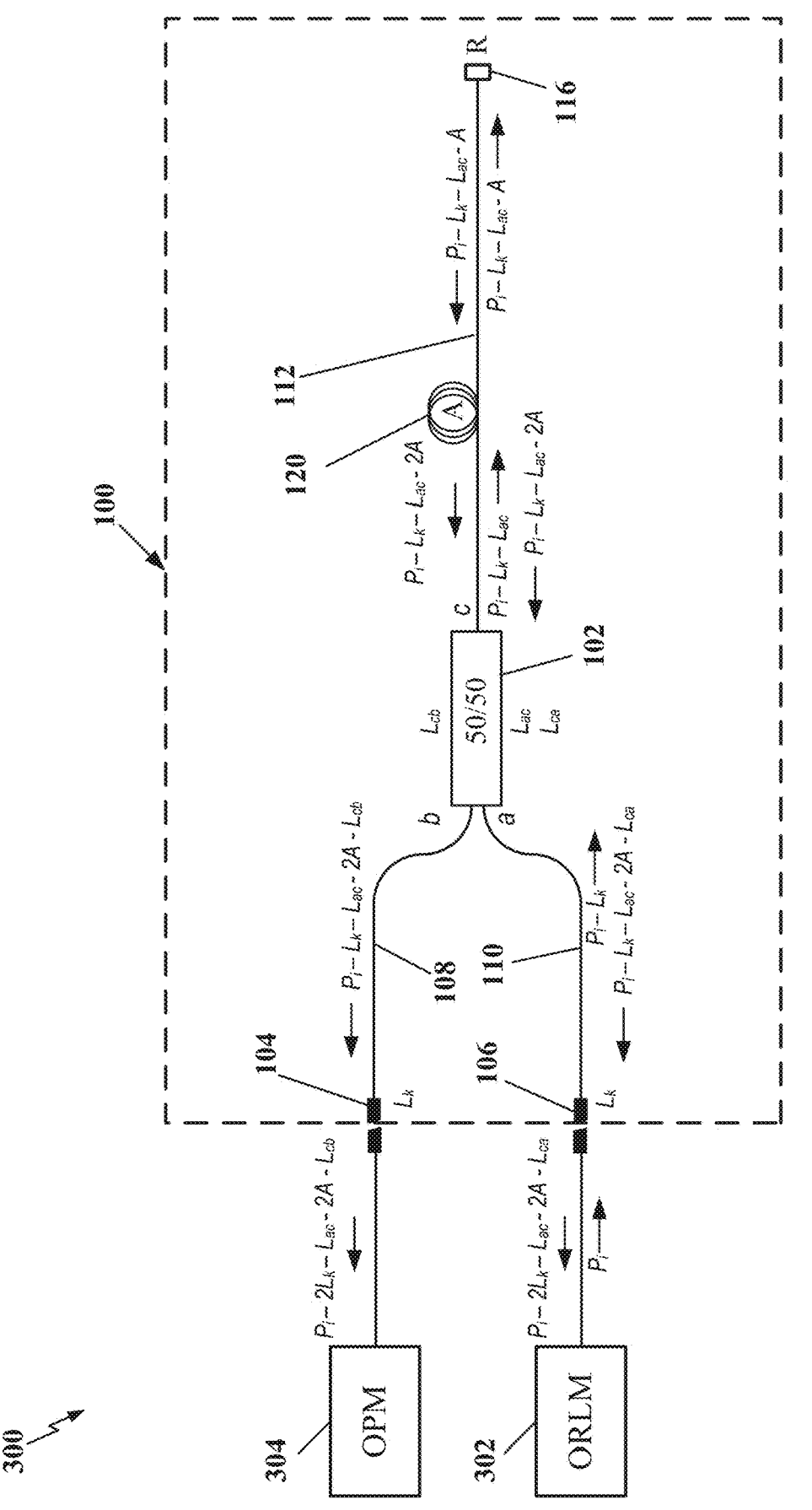
FIG. 5 illustrates the particular power losses that occur in the setup of FIG. 3 in more detail according to aspects of the present disclosure.

FIG. 5 illustrates the particular power losses that occur in the setup 300 in more detail. Here, it is first known that the output power of the ORLM 302 is $P_i$, which was previously measured as described above in connection with FIG. 2. After the power $P_i$ passes the connectors at the input port 106, it experiences a small loss, $L_k$. The power $(P_i-L_k)$ continues through the fiber until it reaches the fiber optic splitter/coupler 102, where the power experiences an insertion loss, $L_{ac}$. This power loss is typically on the order of 3 dB. The power (i.e., $P_i-L_k-L_{ac}$) then continues in the common fiber 112 where it experiences loss A at the attenuator 112 on the common fiber 112. The power after attenuator 112 (i.e., $P_i-L_k-L_{ac}-A$) then reaches the end of the common fiber 112 where the reflector R 116 reflects 100% of the power back through the common fiber in the opposite direction.

The power again experiences the loss A at the attenuator 120 on the common fiber 112. The remaining power (i.e., $P_i-L_k-L_{ac}-2A$) then enters the fiber optic splitter/coupler 102, where it is split into the two legs or "daughter" fibers (i.e., 108 and 110) to the output port 104 and input port 106, respectively, and experiencing different levels of loss. The power going into the fiber 110 with the input port 106 experiences a loss of $L_{ca}$ (i.e., $P_i-L_k-L_{ac}-2A-L_{ca}$), and the power going into the fiber 108 with the output port 104 experiences a loss of $L_{cb}$ (i.e., $P_i-L_k-L_{ac}-2A-L_{cb}$). It is further noted that as the power passes through the output port 104 connector, it experiences another loss of $L_k$ (i.e., $P_i-2L_k-L_{ac}-2A-L_{cb}$) and finally enters the OPM 304 to be measured. As the power passes backwards through the input port 106, it will also experience another loss of $L_k$ ($P_i-2L_k-L_{ac}-2A-L_{ca}$), after which it will finally re-enter the ORLM 302 to be measured.

By analyzing the losses through the system 100 and patch cable connectors 104, 106, the expected optical return loss meter measurement can be determined based on the measured optical power indicated on the optical power meter (OPM). The ORLM 302 will display the difference between the output power and the returned power levels. The OPM 304 will display the output power of the ORLM minus the combined losses through the system.

The difference in the insertion losses through the splitter 102 can be defined according to following relationships (1) through (9):

$$\Delta \equiv L_{ca}-L_{cb} \tag{1}$$

$$\mathrm{ORLM}=P_i-(P_i-2L_k-L_{ac}-2A-L_{ca}) \tag{2}$$

$$\mathrm{OPM}=P_i-2L_k-L_{ac}-2A-L_{cb} \tag{3}$$

$$\mathrm{OPM}=P_i-2L_k-L_{ac}-2A+(L_{ca}-L_{ca})-L_{cb} \tag{4}$$

$$\mathrm{OPM}=(P_i-2L_k-L_{ac}-2A-L_{ca})+L_{ca}-L_{cb} \tag{5}$$

$$\mathrm{OPM}=(P_i-2L_k-L_{ac}-2A-L_{ca})+\Delta \tag{6}$$

$$\mathrm{OPM}-\Delta=(P_i-2L_k-L_{ac}-2A-L_{ca}) \tag{7}$$

$$\mathrm{ORLM}=P_i-(\mathrm{OPM}-\Delta) \tag{8}$$

$$\mathrm{ORLM}=P_i-\mathrm{OPM}+\Delta \tag{9}$$

From this analysis, it may be seen from equation (9) that the expected optical return loss that the ORLM should indicate is a function of the measured optical power, $P_i$, the measured optical power through the FORS implementing system 100, OPM, and the difference in insertion loss values through the splitter/coupler 102 (i.e., A as defined above in equations (1)-(9)).

As an example, it is assumed that an ORLM is connected to an OPM and the output power from the ORLM, $P_i$, and is measured as −6.5 dBm. The ORLM 302 is then connected to the FORS implementing system 100 as shown in FIG. 3. If a user wishes to present an expected optical return loss of 20 dB to the ORLM, for example, the value of $P_i$−OPM+Δ, must be 20 dB. If the attenuation of the inline attenuator 120 on the common fiber 112 is set to zero, and the value of Δ is 0.2 dB, typical loss values for the splitter 102 would yield a value of −13.5 dBm on the OPM 304. This would correspond to an expected value of (−6.5−−13.5+0.2)=7.2 dB optical return loss. In order to reach a level of 20 dB optical return loss, the inline attenuator 120 on the common fiber 112 must be adjusted until the OPM reads a level of (−13.5−(20.0−7.2))=−26.3 dBm. This would yield for $P_i$−OPM+Δ, (−6.5−(−26.3)+0.2)=20 dB. Therefore, the adjustment for the inline attenuator 120 on the common fiber 112 would only need to be adjusted until the OPM indicated −26.3 dBm, and one could expect an optical return loss of 20 dB at the ORLM. The difference of what the ORLM indicates and the expected ORLM value is the error in the ORLM, and should be within the accuracy tolerance for the ORLM to pass verification at this point. If the ORLM is to be subsequently tested at 30 dB, then the inline attenuator 120 on the common fiber 112 would then need to be adjusted until the OPM indicates −36.3 dBm. This would yield for $P_i$−OPM+Δ, (−6.5−(−36.3)+0.2)=30.0 dB expected optical return loss.

Figure 6:
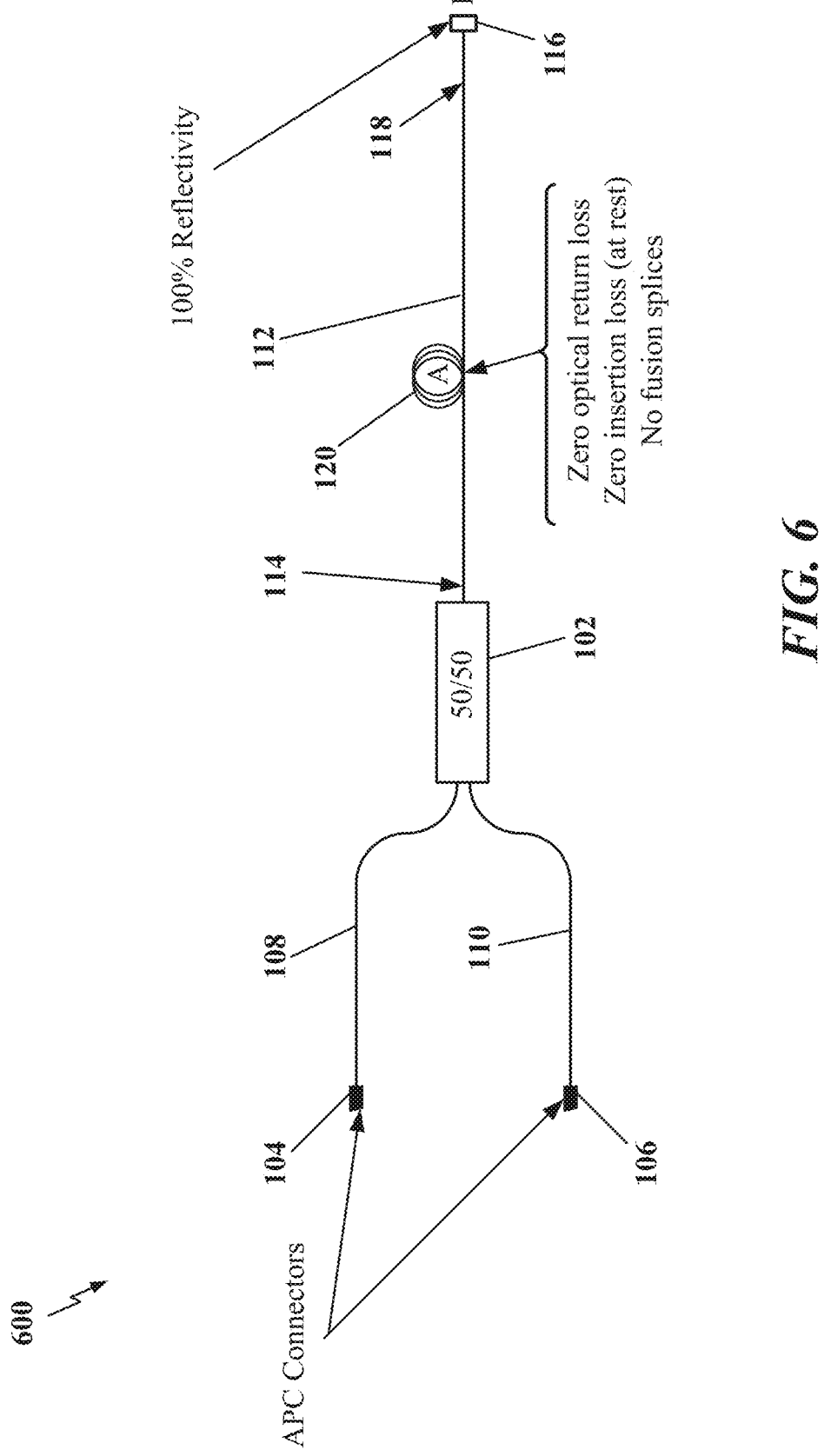
FIG. 6 illustrates some unique aspects of the FORS system in FIG. 1 according to certain aspects of the present disclosure.

FIG. 6 illustrates some unique aspects of the FORS implementing system 100. In particular, system 100 may make use of a standard 50:50 ratio fiber optic splitter/coupler for the fiber optic splitter/coupler 102, but with some exemplary modifications. These modifications include an added termination (e.g., 116) on the common fiber with 100% reflection. This termination 116 can be a standard flat connector, such as an ST-compatible connector with ultra-physical contact (UPC) polish in merely one example. The end face of the connector 116 is then coated with a reflective coating. In an embodiment of this principle, an enhanced silver deposition method may be used to evaporate silver and cause it to attach to the fiber connector end face. The result is a reflective termination with greater than 99.9% reflectivity. Additionally, in some aspects angled physical contact (APC) connectors may be used to terminate each daughter fiber (e.g., 108, 110) of the fiber optic splitter/coupler 102.

In further aspects, the common fiber 112 will include an inline attenuator 120 that produces absolutely no optical return loss (or back reflection), and has absolutely zero insertion loss when at its lowest setting. Standard, commercially available inline attenuators will always have some degree of insertion loss and optical return loss, even with anti-reflective coatings applied. Accordingly, the present invention also features a novel mechanism attached to the common fiber 112 that produces the attenuation and meets the insertion loss and optical loss requirements. It is noted here that the common fiber 112 preferably should be free of fusion splices, which would create small, but quantitatively significant, insertion losses and optical return loss.

Figure 7:
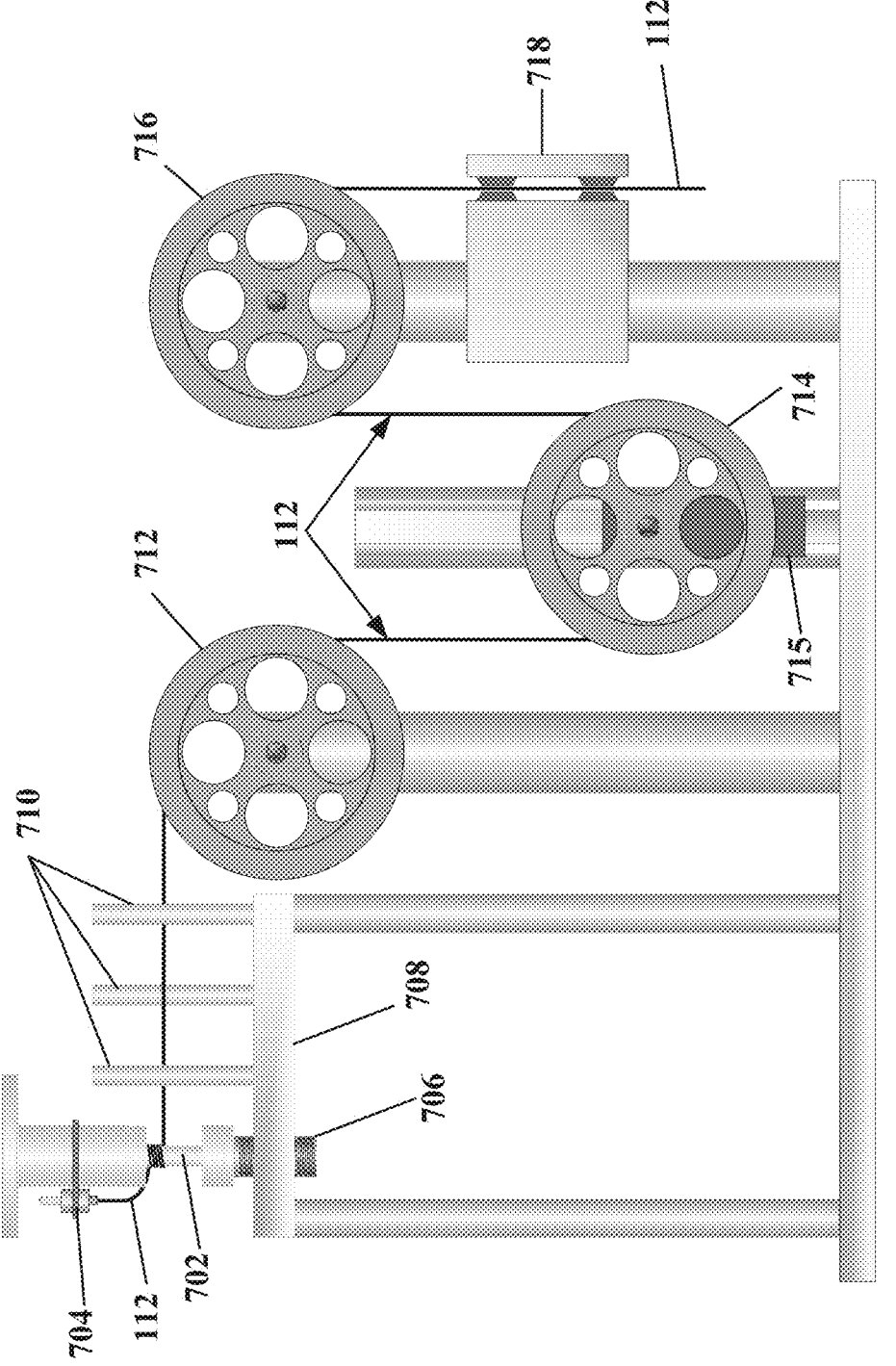
FIG. 7 shows an exemplary attenuator structure that may be used in the system of FIG. 1 according to certain aspects of the present disclosure.

In order to induce inline attenuation on the common fiber 112, an exemplary mechanism or structure for implementing attenuator 120 for inducing attenuation in the common fiber 112 is illustrated in FIG. 7. This design is configured to hold or contain the common fiber 112 in place while a portion of the fiber is wound on a rotatable winding shaft 702. In some aspects, the winding shaft 702 is rotated by a winding mechanism (e.g., not shown in FIG. 7). In further particular aspects, the winding mechanism may be implemented by a handwheel that is on a separate shaft and having a toothed gear that interfaces with a complementary toothed gear located on a portion of the winding shaft 702. In a particular implementation, the handwheel by a "n" number of teeth that drives the complementary toothed gear having an "m" number of teeth where n<m, which allows for finer adjustment resolution for rotating the winding shaft 702. One embodiment may utilize a 4:1 ratio (e.g., 16 teeth on the handwheel to 48 teeth on the winding shaft 702), but the invention is not limited to such. In other embodiments, a motorized mechanism (e.g., a stepper motor and associated gearing) may be used to turn the winding shaft 702.

In some aspects, winding shaft 702 may be implemented using a mandrel, but is not limited to such. The diameter of the mandrel portion of the shaft 702 is dimensioned to be small enough to induce optical power loss in the fiber when the fiber is wound on the mandrel portion of the shaft 702. used in this application. In merely one example, the shaft 702 may be approximately 6 mm in diameter for a single mode fiber, but the diameter is not limited to such. As the common fiber 112 is wound on the shaft 702, the optical power inside the fiber core leaks through the cladding and is lost from the core transmission. This mechanism thus allows the unwound fiber to be at rest without causing insertion loss or optical return loss. As the common fiber 112 is wound, the mechanism holds the fiber tightly enough on the 702 that it produces the desired attenuation, without stretching the fiber. It is noted that springs are not as beneficial for holding the fiber, since the tension in the fiber would increase as springs stretch. Accordingly, the design of this mechanism uses gravity to hold the common fiber on the shaft 702 as it is wrapped, and allows it to be wound and unwound repeatedly without user intervention or becoming tangled. Further, attenuator 120 may include a fixture 704 attached to the spindle shaft 702 that protectively holds the reflective end of the common fiber 112 in place, so that when the spindle shaft 702 is rotated, the fiber 112 winds on the mandrel portion of the shaft.

In still further aspects, the winding mechanism, wheel, or fixture is configured is to turn shaft 702 to hold the reflective termination on the common fiber. The winding mechanism, wheel, or fixture turns with the shaft 702 as the common fiber 112 is wound and unwound. The shaft 702 may be integrated into a threaded turning shaft 706 in one example. The threads on the turning shaft 706 may be pitched so that one complete cycle raises the shaft 702 the thickness of the common fiber 112 in one example. This ensures that the common fiber 112 does not wind on itself, but stays against the shaft 702 when winding and unwinding.

A base or similar holding means 708 that holds the turning shaft 706 is configured with threads matching the turning shaft. The threads on the shaft and base may be configured to be tight enough to prevent the turning shaft 702 from any significant lateral movement or wobbling. Those skilled in the art will appreciate that other mechanisms could also be employed that achieve the equivalent functionality of preventing the turning shaft 702 from lateral movement or wobbling. A plurality of friction posts 710 may be utilized help direct the fiber from a pulley (e.g., 712) onto the shaft 702.

Pulley 712 is configured with very low friction that then allows the common fiber 112 to be pulled over the pulley during the winding and unwinding of the common fiber 112.

The pulley 712 changes the direction of the common fiber 112 from horizontal to vertical so that the common fiber 112 feeds perfectly vertically into a sliding pulley 714. In aspects, the radius of the pulley 712 (and the sliding pulley 714) are configured to be large enough to prevent any bending loss in the fiber 112.

In further aspects, the sliding pulley 714 may be mounted on a very low-friction track 715 that slides up and down as the fiber is wound and unwound on the shaft 702. As the turning shaft 706 turns, the fiber 112 is wound on the shaft 702, and this causes the sliding pulley 714 to rise. The fiber 112 feeds around this pulley 714 perfectly vertically in order to maintain the same tension in the fiber 112. If the fiber 112 were to enter and exit the pulley 714 at an angle, the tension in the fiber 112 would increase significantly as the fiber 112 is wound. The weight of this pulley 714 is such that it keeps the fiber 112 wound on the shaft 702 and inside the tracks on pulleys 712 and another third pulley 716, but not so great that it causes the fiber 112 to measurably stretch. Similar to the other pulleys, the third pulley 716 is configured with a radius large enough to prevent bending loss in the fiber. This pulley 716 remains stationary in some examples.

Further, the mechanism for attenuator 120 shown in FIG. 7 includes a holding mechanism or means 718 for holding the common fiber 112 firmly in place, so that the turning action on the turning shaft 706 causes the fiber 112 to wind, and the sliding pulley 714 to rise. In one embodiment, rubber pads may be utilized for mechanism 718 to hold or clamp the fiber 112 in place.

Figure 8:
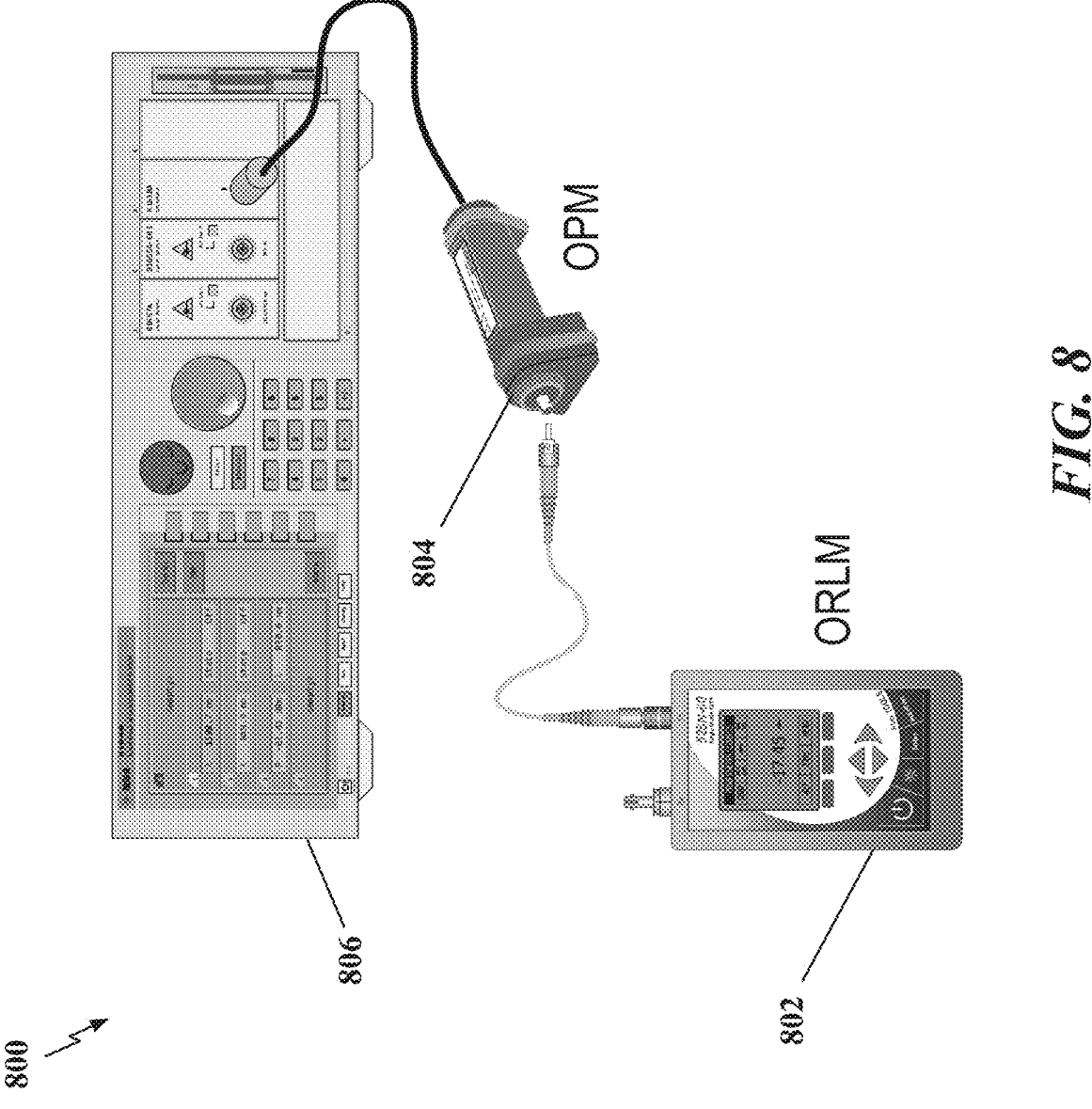
FIG. 8 illustrates an exemplary setup using common off the shelf components for implementing operation of the system of FIG. 1 according to some aspects of the present disclosure.
Figure 9:
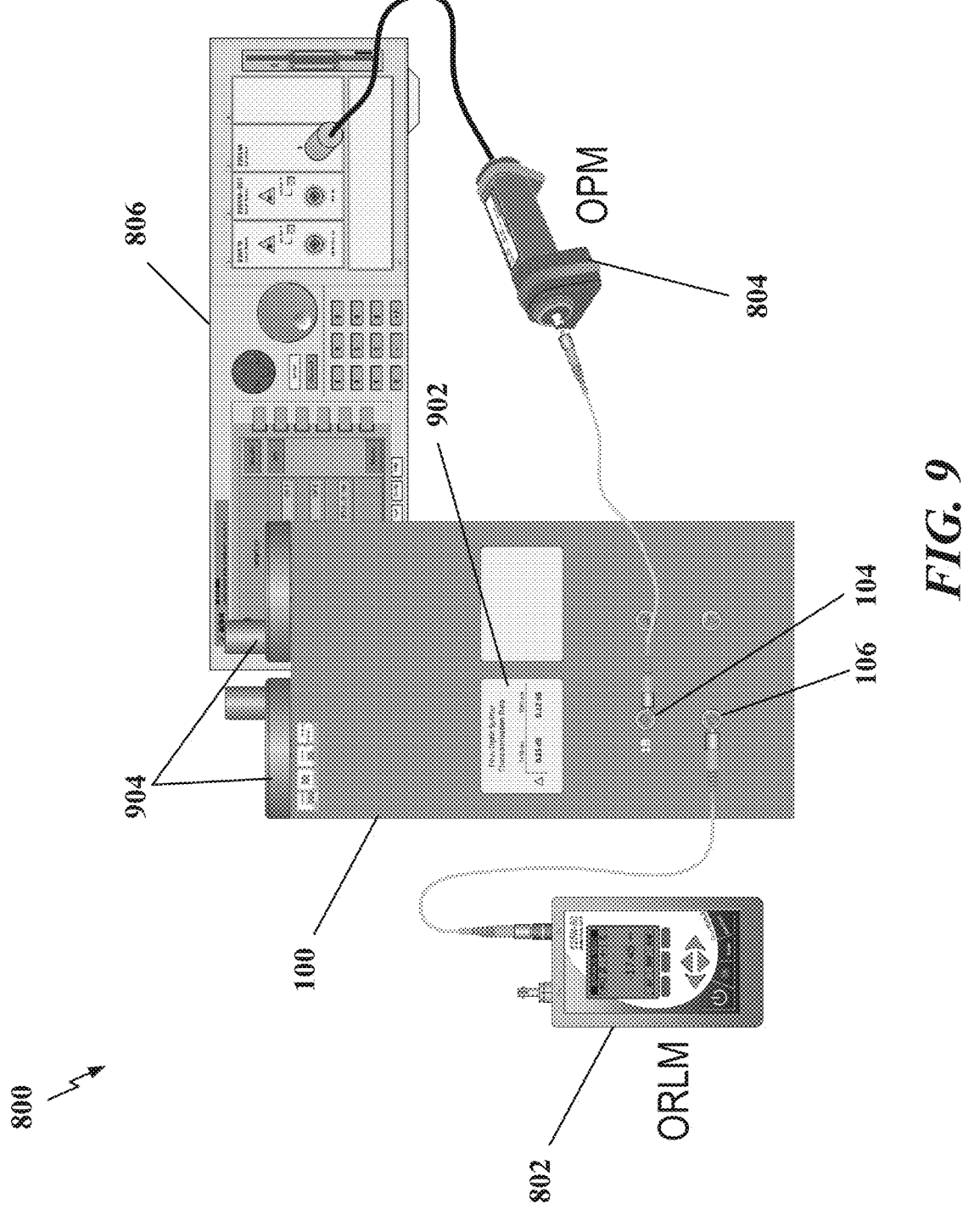
FIG. 9 illustrates a further setup of the illustration of FIG. 8 including implementing operation of the system of FIG. 1 according to some aspects of the present disclosure.

FIGS. 8 and 9 illustrate one exemplary procedure/set-up 800 for the calibration of an ORLM 802 using the system 100. FIG. 8, in particular, illustrates the provision of the ORLM 802 to be tested, an OPM 804, and an optical measurement system 806 coupled to the OPM 804. In one example, the optical measurement system 806 may be implemented with a lightwave measurement system (i.e., Agilent Model 8164B measurement system), but could be substituted with any suitable optical component testing equipment. Here, the testing may first commence with coupling ORLM 802 to OPM 804 as was discussed previously in connection with FIG. 2.

FIG. 9 illustrates the provision of the system 100 as described above and coupled to both the ORLM 802 and the OPM 804, which is, in turn, coupled to the optical measurement system 806. As illustrated, FORS implementing apparatus 100 may be configured with adjustment mechanisms or wheels (e.g., 904 illustrated in FIG. 9, which may be implemented or operated as discussed earlier) for adjustment of the attenuator 120. In further aspects, a fiber optic inspection scope may be integrated within an enclosure of the FORS implementing apparatus 100 with a graphical user interface and display.

FIGS. 10A, 10B, and 10C illustrate a flow diagram of a method 1000 for carrying out the testing using the set-up of FIGS. 8 and 9, as an example. Prior to commencing operation of method 1000, however, it is noted that best practice for achieving accurate measurements is to inspect and clean all cable connectors and connector adapters before making any fiber optic connection. Method 1000 includes first connecting a fiber optic cable (e.g., a straight tip connector to angled fiber channel connector (i.e., ST-A/FC) fiber optic cable) from the fiber optic return loss meter (ORLM) to a fiber optic power meter (OPM) (e.g., a standard OPM) as indicated at block 1002. In one example, an ST-A/FC fiber optic cable may be utilized, although the disclosure is not limited to such and could use Square Connector (SC) or Lucent Connector (LC) as well. Assuming use of an ST-A/

FC fiber optic cable, the ST connector is inserted into the ORLM and the angled FC (A/FC) connector is inserted into the OPM, which may have an 81000FA adapter in some examples.

After connection in block 1002, a return loss measurement on the ORLM is performed as shown at block 1004. In certain aspects, the ORLM return loss indication should indicate a return loss numerically greater than 50 dB (i.e., 51 dB, 55 dB, etc., or "-LO-"). If the return loss is not numerically greater than 50 dB, this may indicate that the ST-A/FC cable should be substituted with a new cable, and/or that the connectors should be inspected and cleaned and the process of block 1004 should be repeated. If the reading fails to yield less than 50 dB, then the ORLM has failed calibration. Next, record the initial power measurement indicated on the OPM (in dBm) as $P_i$ and halt or discontinue the return loss measurement on the ORLM as shown at block 1006.

Method 1000 further includes disconnecting the OPM and the ORLM (and may include again inspecting and cleaning all connectors and ports used in this process), and then connecting the ORM and ORLM to the FOR implementing apparatus (e.g., 100) as shown at block 1008. In particular, the ORLM may be coupled to an input connector 1A of the FOR implementing apparatus (e.g., input 106) and an A/FC to A/FC fiber optic cable (as merely one example) is connected from the FORS implementing apparatus connector 1B (output 104) to the OPM.

In a next step, method 1000 includes setting or adjusting the attenuator 120 to a prescribed, initial, or reset value of A (or $A_i$) as shown at block 1010. In aspects, the adjustment mechanism or wheel (e.g., 704) on the FORS implementing apparatus may be turned completely until it stops in the direction of a "RESET" (or similar marking) arrow on the wheel. In further aspects, the wheel may be configured to turn easily until it reaches a detent or stop, which may further correspond to the prescribed, initial, or reset value of A.

Next, method 1000 includes performing a return loss measurement on the ORLM as indicated at block 1012. In an aspect, a table of one or more further measurements and calculations based on measurements may be recorded in a table (or equivalent memory device) and exemplified by a calibration worksheet (shown later herein as TABLE 1), to assist in recordation of the measurements and calculations. The process of block 1012 may include first recording measurement of the indication on the OPM as first recorded OPM value $OPM_1$ and then calculating the expected optical return loss, a first expected optical return loss ($ORL_{1E}$), using the following formula (10):

$$ORL_{1E}=P_i-OPM_1+\Delta \quad (10)$$

where the value $\Delta$ is derived from splitter characterization data for the particular wavelength being tested. As discussed earlier, $\Delta$ is the difference in the insertion loss values through the different daughter branches of the splitter (i.e., $L_{ca}-L_{cb}$). In some aspects, this value may be provided by the vendor of the splitter or, in other aspects, independently measured. In some aspects, the splitter characterization data may be printed on the enclosure of the FORS implementing apparatus 100 for user convenience (See e.g., 902 in FIG. 9).

Method 1000 further includes calculating a first attenuation value that produces a first predetermined power return loss for the ORL using the determined return loss measurement from equation (10) as shown at block 1014. In one example, an attenuation $A_1$ may be calculated that is needed to produce a 20 dB return loss on the ORL using the following equation (11):

$$A_1=20-ORL_{1E} \quad (11).$$

Next as shown at block 1016, method 1000 includes calculating a first expected OPM indication (e.g., $OPM_2$) for the first predetermined return loss (e.g., 20 dB) based on the calculated first attenuation value (e.g., $A_1$) using the following equation (12):

$$OPM_2=OPM_1-A_1 \quad (12).$$

As indicated in block 1018 in FIG. 10B, the attenuator is next adjusted (e.g., turn the adjustment mechanism or wheel 704 in the direction opposite to a RESET direction arrow) until the OPM indicates a power reading of the first expected OPM indication ($OPM_2$) within a desired tolerance range (e.g., within ±0.5 dB). Next at block 1020, the actual OPM reading is then recorded as a second recorded OPM value $OPM_{2A}$, and the optical return loss reading from the ORLM is recorded as a second optical return loss value of the ORLM ($ORLM_2$).

At block 1022, method 1000 includes calculating a second expected optical return loss value for the ORLM (e.g., $ORL_{2E}$) using the second recorded OPM value ($OPM_{2A}$), for the current OPM level, according to the following equation (13):

$$ORL_{2E}=P_i-OPM_{2A}+\Delta \quad (13)$$

where, again, the value $\Delta$ is derived from splitter characterization data for the particular wavelength being tested.

Next as shown at block 1024, an absolute difference, ε2, is calculated between the second expected optical return loss value for the ORLM (e.g., $ORL_{2E}$) and the measured second optical return loss value of the ORLM (e.g., $ORLM_2$) according to the following equation (14):

$$\varepsilon_2=|ORL_{2E}-ORLM_2| \quad (14).$$

According to some aspects, the processes of block 1024 may include checking whether this difference ε2 is less than or equal to some predetermined threshold power loss (e.g., ε2≤0.5 dB).

Further, method 1000 includes calculating a second attenuation value $A_2$ that will produce a second predetermined return loss for the ORL using the first determined return loss measurement (i.e., $ORL_{1E}$) from equation (10) as indicated at block 1026. In one example, the second attenuation value $A_2$ may be greater than the first attenuation value $A_1$. In a particular example, the second attenuation value $A_2$ may be calculated to produce a 30 dB return loss on the ORL using the following equation (15):

$$A_2=30-ORL_{1E} \quad (15).$$

Next as shown at block 1028, method 1000 includes calculating a second expected OPM indication (e.g., $OPM_3$) for the second predetermined return loss (e.g., 30 dB) for the ORL based on the calculated second attenuation value (e.g., $A_2$) and the first recorded OPM value $OPM_1$ using the following equation (16):

$$OPM_3=OPM_1-A_2 \quad (16).$$

As indicated in block 1030, the attenuator is next adjusted (e.g., again turn the adjustment mechanism or wheel 704 in the direction opposite to a RESET direction arrow to change the fiber optic cable attenuation) until the OPM indicates a power reading of the second expected OPM indication ($OPM_3$) within a desired tolerance range (e.g., within ±0.5 dB). After this attenuation adjustment, the actual OPM reading is then recorded as a third recorded OPM value (e.g., $OPM_{3A}$) and the optical return loss reading from the ORLM is recorded as a third optical return loss value of the ORLM (e.g., $ORLM_3$) as indicated in block 1032.

At block 1034, method 1000 includes calculating a third expected optical return loss value for the ORLM (e.g., $ORL_{3E}$) using the third recorded OPM value ($OPM_{MA}$), for the current OPM level, according to the following equation (17):

$$ORL_{3E}=P_i-OPM_{3A}+\Delta \qquad (17)$$

where, again, the value $\Delta$ is derived from splitter characterization data for the particular wavelength being tested.

Further, as shown in block 1036, an absolute difference 83 is calculated between the third expected optical return loss value for the ORLM (e.g., $ORL_{3E}$) and the recorded, measured third optical return loss value of the ORLM (e.g., $ORLM_3$) as shown in the following equation (18):

$$\varepsilon_3=|ORL_{3E}-ORLM_3| \qquad (18)$$

According to some aspects, the processes of block 1036 may include checking whether this difference $\varepsilon_3$ is less than or equal to some threshold power loss (e.g., $\varepsilon_3 \leq 0.5$ dB).

Further, method 1000 includes calculating a third attenuation value $A_3$ that will produce a third predetermined return loss for the ORL using the first determined return loss measurement (i.e., $ORL_{1E}$) from equation (10) as indicated at block 1038. In one example, the third attenuation value $A_3$ may be greater than both the first and second attenuation values $A_1$ and $A_2$. In a particular example, the third attenuation value $A_3$ may be calculated to produce a 40 dB return loss on the ORL using the following equation (19):

$$A_3=40-ORL_{1E} \qquad (19)$$

Next as shown at block 1040, method 1000 includes calculating a third expected OPM indication ($OPM_4$) for the third predetermined return loss (e.g., a 40 dB return loss) based on the calculated third attenuation value (e.g., $A_3$) and the first recorded OPM value $OPM_1$ using the following equation (20):

$$OPM_4=OPM_1-A_3 \qquad (20)$$

As indicated in block 1042, the attenuator is next adjusted (e.g., again turn the adjustment mechanism or wheel 704 in the direction opposite to a RESET direction arrow to change the fiber optic cable attenuation) until the OPM indicates a power reading of the third expected OPM indication ($OPM_4$) within a desired tolerance range (e.g., within 0.5 dB). After this attenuation adjustment, the actual OPM reading is then recorded as a fourth recorded OPM value (e.g., $OPM_{4A}$) and the optical return loss reading from the ORLM is recorded as a fourth optical return loss value of the ORLM (e.g., $ORLM_4$) as indicated in block 1044.

Next, process 1046 includes calculating a fourth expected optical return loss (e.g., $ORL_{4E}$) using the fourth recorded OPM value ($OPM_{4A}$) for the current OPM level according to the following equation (21):

$$ORL_{4E}=P_i-OPM_{4A}+\Delta \qquad (21)$$

where, again, the value $\Delta$ is derived from splitter characterization data for the particular wavelength being tested.

Finally, method 1000 may include calculating the absolute difference $\varepsilon_4$ between the fourth expected optical return loss (e.g., $ORL_{4E}$) and the measured optical return loss and the fourth optical return loss value of the ORLM (e.g., $ORLM_4$) according to the following equation (22):

$$\varepsilon_4=|ORL_{4E}-ORLM_4| \qquad (22)$$

According to some aspects, the processes of block 1048 may include checking whether this difference $\varepsilon_4$ is less than or equal to some threshold power loss (e.g., $\varepsilon_3 \leq 0.5$ dB).

In further aspects, it is noted that method 1000 is merely one example, and those skilled in the art will appreciate that the testing and calibration preformed may be limited to one or more iterations rather than the four iterations described in connection with FIGS. 10A-10C. at two different levels instead of the four we use, or at different levels, or more than four iterations in other aspects. The number of points tested, and the levels of those points, are application and user-specific, but can all be achieved with presently disclosed methodology.

TABLE 1 below illustrates an exemplary ORLM Calibration Worksheet that may be utilized with the present methods (e.g., method 1000) and FORS implementing apparatus (e.g., 100).

TABLE 1

| Parameter | Value | Dimension | Measured or Calculated |
|---|---|---|---|
| $P_i$ | | dBm | Measured |
| $OPM_1$ | | dBm | Measured |
| $ORL_{1E}$ | | dB | Calculated |
| $A_1$ | | dB | Calculated |
| $OPM_2$ | | dBm | Calculated |
| $OPM_{2A}$ | | dBm | Measured |
| $ORLM_2$ | | dB | Measured |
| $ORL_{2E}$ | | dB | Calculated |
| $\varepsilon_2$ | | dB | Calculated |
| $A_2$ | | dB | Calculated |
| $OPM_3$ | | dBm | Calculated |
| $OPM_{3A}$ | | dBm | Measured |
| $ORLM_3$ | | dB | Measured |
| $ORL_{3E}$ | | dB | Calculated |
| $\varepsilon_3$ | | dB | Calculated |
| $A_3$ | | dB | Calculated |
| $OPM_4$ | | dBm | Calculated |
| $OPM_{4A}$ | | dBm | Measured |
| $ORLM_4$ | | dB | Measured |
| $ORL4_E$ | | dB | Calculated |
| $\varepsilon_4$ | | dB | Calculated |

In light of the foregoing description, those skilled in the art will appreciated that the presently disclosed methods, apparatus, and systems for implementing a fiber optic reflectance standard (FORS) provide not only an accurate and consistent means of measurement, but also a traceable means to calibrate a test instrument (TI) (e.g., an ORLM). This results in an uncertainty that is at least four times better than a typical test instrument.

Although the invention has been described in detail with reference to certain preferred embodiments, variations and modifications exist within the spirit and scope of the invention as described and defined in the following claims.

The invention claimed is:

1. An apparatus for testing and calibration of a fiber optic instrument that implements a fiber optic reflectance standard (FORS) testing procedure, the apparatus comprising:

an optical splitter;

first and second optical inputs coupled to the optical splitter;

an optical fiber having first and second ends, and coupled to the optical splitter at the first end of the optical fiber;

an attenuator configured to contain a portion of the optical fiber between the first and second ends and selectively attenuate optical signal gain of the optical fiber; and an optical reflector coupled to the second end of the optical fiber;

wherein the first optical input is configured to couple with an optical power meter (OPM) and the second optical input is configured to couple with an optical return loss meter (ORLM).

2. The apparatus of claim 1, wherein the optical splitter comprises 1×2 fiber optic splitter including one of a fused biconical taper (FBT) or a planar lightwave circuit (PLC).

3. The apparatus of claim 2, wherein the optical splitter is configured as polarization maintaining (PM).

4. The apparatus of claim 1, wherein the optical reflector comprises a 100 percent reflectance device.

5. The apparatus of claim 1, wherein the fiber optic instrument being tested and calibrated comprises an optical return loss meter.

6. An apparatus for testing and calibration of a fiber optic instrument that implements a fiber optic reflectance standard (FORS) testing procedure, the apparatus comprising:
    an optical splitter;
    first and second optical inputs coupled to the optical splitter;
    an optical fiber having first and second ends, and coupled to the optical splitter at the first end of the optical fiber;
    an attenuator configured to contain a portion of the optical fiber between the first and second ends and selectively attenuate optical signal gain of the optical fiber; and
    an optical reflector coupled to the second end of the optical fiber;
    wherein the attenuator comprises an inline mechanical attenuator including:
        a winding mechanism around which the optical fiber is wound; and
        one or more pulleys configured to prevent bending loss in the optical fiber during winding of the optical fiber with the winding mechanism.

7. The apparatus of claim 6, wherein the winding mechanism comprises:
    a rotatable shaft around which the optical fiber is wound due to rotation for selectively adjusting attenuation of the optical signal gain of the optical fiber.

8. A method for testing and calibration of a fiber optic instrument comprising:
    recording an initial return loss measurement on the fiber optic instrument and recording an initial power measurement $P_i$ with an optical power meter (OPM);
    optically coupling the fiber optic instrument and OPM to a fiber optic reflectance standard (FORS) implementing apparatus configured with an attenuator for selective adjustment of an attenuation of the FORS implementing apparatus and an optical splitter;
    determining at least a first expected optical return loss measurement of the fiber optic instrument based on the initial power measurement, a first reading of the OPM after optical coupling of the fiber optic instrument and OPM, and splitter characterization data of the optical splitter;
    calculating a first attenuation value that produces a first predetermined return loss for optical return loss of the fiber optic instrument using the at least a first expected optical return loss measurement;
    calculating at least a first expected OPM value for the first predetermined return loss based on the calculated first attenuation value;
    adjusting the attenuation of the FORS implementing apparatus with the attenuator until the OPM reads a power reading equal to the first expected OPM value;
    recoding a current OPM reading as at least a second recoded OPM value and an optical return loss reading from the fiber optic instrument as a second optical return loss value of the fiber optic instrument;
    determining at least a second expected optical return loss measurement of the fiber optic instrument based on the initial power measurement, at least a current second reading of the OPM, and the splitter characterization data of the optical splitter;
    calculating at least a second attenuation value that produces at least a second predetermined return loss for optical return loss of the fiber optic instrument using the at least a second expected optical return loss measurement;
    calculating at least a second expected OPM for the second predetermined return loss based on the calculated at least a second attenuation value;
    adjusting the attenuation of the FORS implementing apparatus with the attenuator until the OPM reads a power reading equal to the at least a second expected OPM; and
    calculating a difference between the at least a second expected optical return loss for the fiber optic instrument and at least a second optical return loss value for the fiber optic instrument.

9. The method of claim 8, wherein the fiber optic instrument comprises an optical return loss meter (ORLM).

10. The method of claim 8, further comprising:
    repeating testing including:
        calculating at least a third attenuation value that produces at least a third predetermined return loss for optical return loss of the fiber optic instrument using the at least a third expected optical return loss measurement;
        calculating at least a third expected OPM for the second predetermined return loss based on the calculated at least a second attenuation value;
        adjusting the attenuation of the FORS implementing apparatus with the attenuator until the OPM reads a power reading equal to the at least a third expected OPM; and
        calculating a difference between the at least a third expected optical return loss for the fiber optic instrument and at least a third optical return loss value for the fiber optic instrument.

11. The method of claim 8, wherein calculating the difference between the at least a second expected optical return loss for the fiber optic instrument and at least a second optical return loss value for the fiber optic instrument further comprises checking to determine whether the difference is less than or equal to a predetermined power threshold.

12. The method of claim 8, wherein the optical splitter comprises 1×2 fiber optic splitter including one of a fused biconical taper (FBT) or a planar lightwave circuit (PLC).

13. The method of claim 12, wherein the optical splitter is configured as polarization maintaining (PM).

14. The method of claim 8, wherein the attenuator comprises an inline mechanical attenuator including:
    a winding mechanism around which the optical fiber is wound; and
    one or more pulleys configured to prevent bending loss in the optical fiber during winding of the optical fiber with the winding mechanism.

15. The method of claim 14, wherein the winding mechanism comprises:
    a rotatable shaft around which the optical fiber is wound due to rotation for selectively adjusting attenuation of the optical signal gain of the optical fiber.

* * * * *